E. P. KENDALL.
POTATO CLEANER.
APPLICATION FILED DEC. 2, 1910. RENEWED OCT. 25, 1913.
1,199,703.
Patented Sept. 26, 1916.
2 SHEETS—SHEET 1.
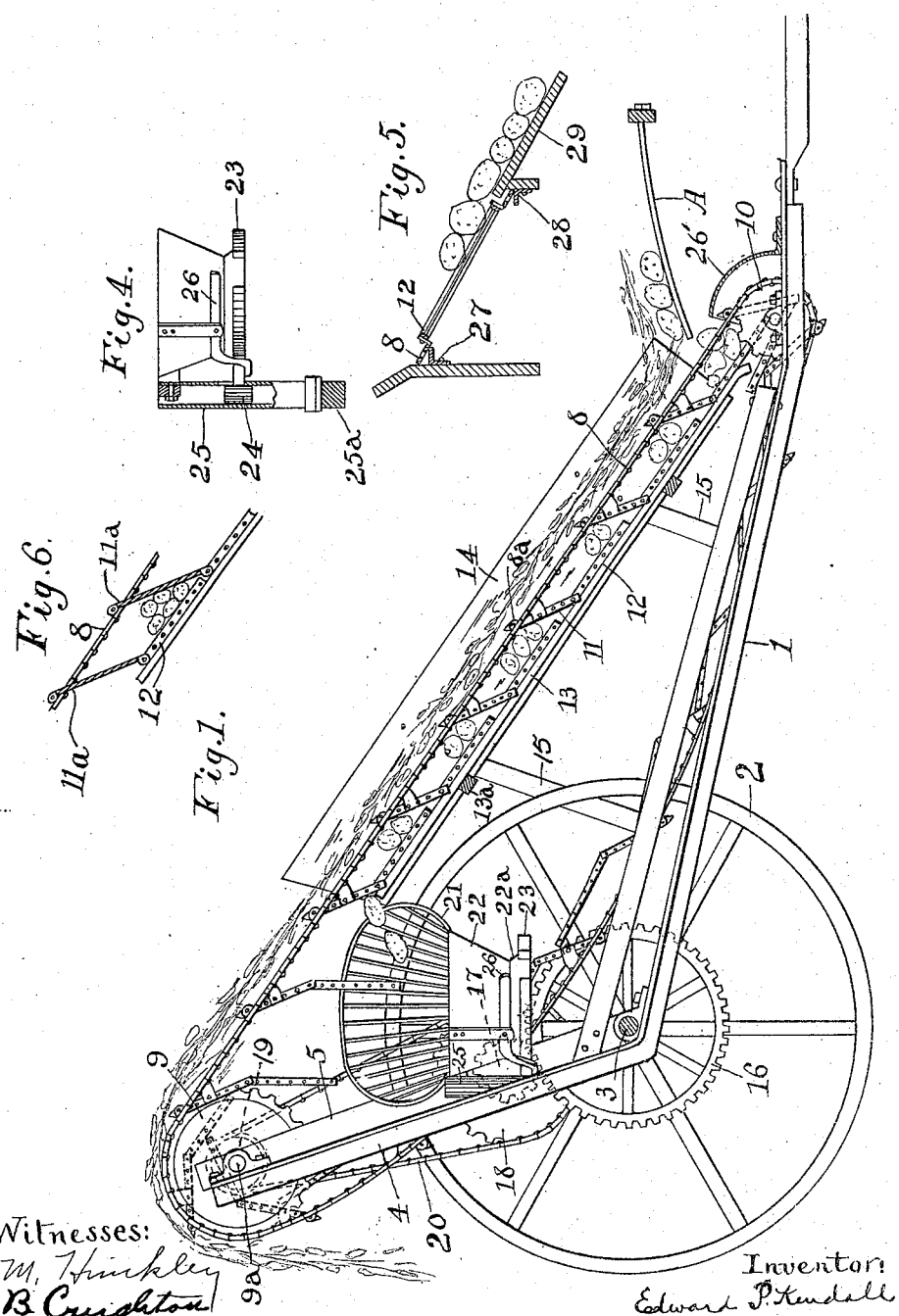
Witnesses:
E. M. Hinkley
C. B. Creighton
Inventor:
Edward P. Kendall
by S. W. Bates
Atty.

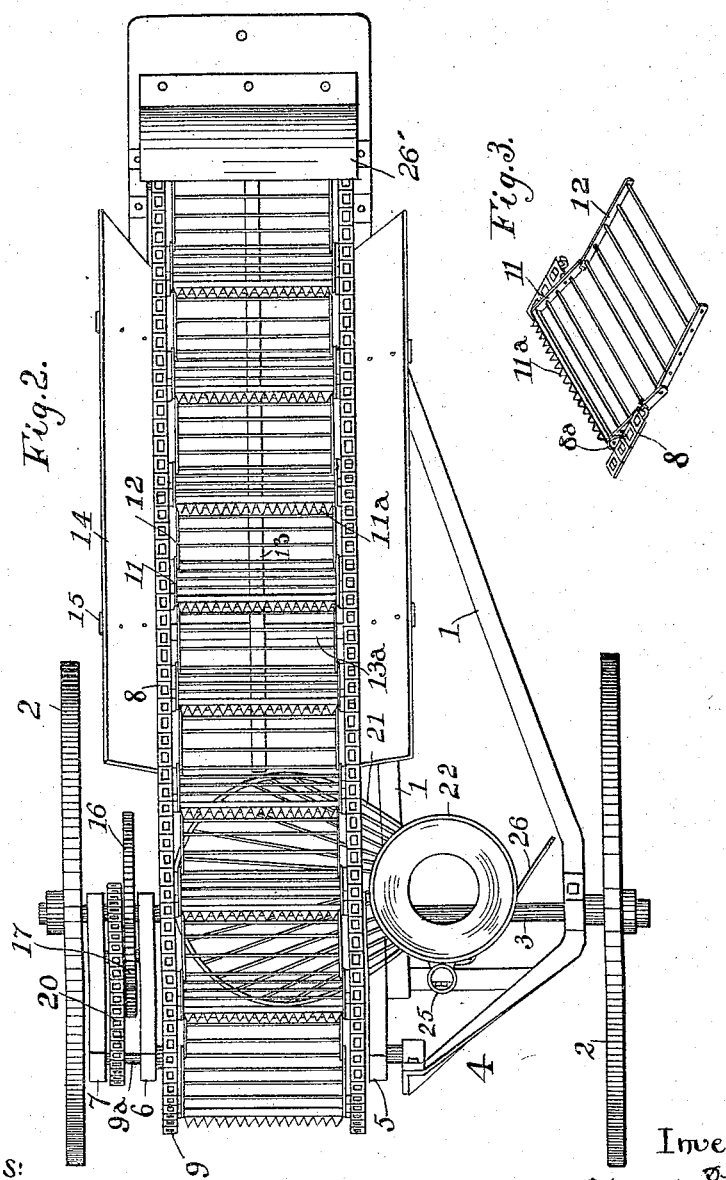

UNITED STATES PATENT OFFICE.

EDWARD P. KENDALL, OF BOWDOINHAM, MAINE.

POTATO-CLEANER.

1,199,703.      Specification of Letters Patent.     Patented Sept. 26, 1916.

Application filed December 2, 1910, Serial No. 595,168. Renewed October 25, 1913. Serial No. 797,327.

*To all whom it may concern:*

Be it known that I, EDWARD P. KENDALL, of Bowdoinham, in the county of Sagadahoc and State of Maine, have invented certain new and useful Improvements in Potato-Cleaners, of which the following is a specification.

My invention relates to a machine for harvesting potatoes.

The object of my invention is to produce a harvesting machine which will take the potatoes as they come from a digger, separate them from the vines and earth and deposit them in a suitable receptacle.

Machines for digging potatoes are now of common use, of which any suitable form may be used in connection with a machine embodying my invention.

The invention as I embody it in a practical harvester, consists of an endless conveyer suitably mounted and adapted to be drawn in rear of the digger to receive the potatoes as they come from the digger, and to free them from the vines, sods, and earth. The material is carried to the point of discharge where the bed of the conveyer is opened, and the potatoes are allowed to drop through preferably into a bag or other suitable receptable which is suspended or disposed at the discharge point. The earth is largely sifted through the open bed of the conveyer on the way to the discharge point and the vines and balance of the materials on the conveyer are carried along and discharged at the rear.

I illustrate one form of my invention by means of the accompanying drawing in which:—

Figure 1 is a side elevation of a machine embodying my invention with one side board and wheel omitted. Fig. 2 is a plan of the harvester. Fig. 3 is a detail of one of the conveyer sections. Fig. 4 is a detail of the bagging device. Fig. 5 is a section showing an alternative arrangement for discharging the potatoes from the conveyer, and, Fig. 6 is a detail showing modified forms of a conveyer section.

In the drawing, 1 represents a suitable frame mounted on wheels 2, secured to a shaft 3 and adapted to support an endless conveyer. The frame is provided with means by which it may be secured at the rear end of any of the standard potato diggers, and uprights 4, 5, 6, and 7 at the rear, support the mechanism for imparting motion to the conveyer.

A represents the rear portion of a potato digger, being the parallel rods over which the vines, earth, and potatoes are discharged from the digger.

The potatoes and vines are received on the moving bed or upper run of an endless conveyer composed of sections. The upper run of the conveyer preferably travels up an inclined way to bring the potatoes to a discharge point whence they may be dropped into a receptacle. The bed of the conveyer is preferably made sufficiently open so as to allow the dirt to largely sift out while retaining the potatoes, and means are provided for discharging the potatoes before they reach the top of the conveyer.

As here shown, the conveyer is made up of a pair of parallel sprocket chains, 8, one on each side of the conveyer. These chains, 8, run over a pair of sprocket wheels, 9, secured to a shaft $9^a$ at the top of the frame. The chains also pass over guide wheels 10 at the bottom of the frame, so that the working portion of the conveyer presents a straight run from the guide wheel 10 to the sprocket wheel 9.

The conveyer proper is composed of a series of sections preferably made in skeleton form to allow the earth to sift through. Each section when it becomes a part of the upper run of the conveyer has preferably a general forward and downward inclination, for the purpose of causing the potatoes to roll forward and downward on the sections where they lodge thereby separating them effectively from the vines and turf. In the preferable form of the harvester, the sections are pivoted and guided, so that they dump the potatoes before the top of the conveyer is reached, allowing the vines to continue on over the end of the conveyer.

As here shown, the conveyer sections are made up of relatively fixed rear portions 11, secured rigidly by lugs $8^a$ to the links of the chain 8. They have preferably a downward and forward inclination when on the upper run of the conveyer for the purpose of allowing the potatoes to roll downward and contrary to the general motion of the vines and turf. A forward portion 12 is here shown as pivoted, preferably at its rear end, to the rear section 11, so that the forward end of the section 12 is free to move vertically.

The conveyer sections are preferably made up as here shown, with side bars and horizontal cross rods, which while allowing the potatoes to roll freely forward and downward, offer considerable obstructions to the vines and turf and promote the separation of the potatoes from the debris.

For the purpose of catching turf, loose grass, etc., I form on the rear section a series of spurs or projections 11$^a$, these spurs serving to check the tendency of the light material to follow the potatoes as they roll downward.

The conveyer sections are so arranged as here shown, that the rear portion of each, will form an abutment or stop to hold the potatoes upon the next rearward section, while they are moving up the incline to the discharge point. As here shown, the forward pivoted portion 12, of each section underlaps the rear portion of the adjacent section to form a retaining pocket or space into which the potatoes roll during their ascent.

To hold the sections 12, normally in their upper positions from the time they enter the upper run of the conveyer until they reach the point at which they are permitted to swing to discharge potatoes, I employ a guide 13, upon which guide the portions 12 rest and ride, thus supporting the rear portion 11, and the chain 8. The guide 13 is supported upon suitable cross bars 13$^a$, these in turn as here shown, being secured to the side pieces 14. The side pieces 14 for holding the material on the conveyer are supported on standards 15, secured to the frame 1.

A casing 26', is provided to cover the lower guide wheels 10 and to prevent the potatoes spilling over the front end of the conveyer.

Power is applied to the conveyer in any suitable manner. As here shown, a gear 16, secured to the shaft 3, engages a pinion 17 on the same shaft with a sprocket wheel 18 connected to the sprocket wheel 19, by means of a sprocket chain 20. The sprocket wheel 19 is on the same shaft 9$^a$ as the sprocket wheels 9, which support the conveyer chains. Means are provided for discharging the potatoes before they reach the upper end of the conveyer. This I have shown to be accomplished by permitting the portion 12 of each conveyer section, when it has reached a predetermined point, to drop down and dump the potatoes which are lodged upon it and between it and the part 11 of the adjacent section. The rear portion 11 being fixed to the chain does not tilt and tends to hold the vines and turf from following the potatoes. The dropping of the portion 12, is effected by simply terminating the guide 13, at the desired point.

Means are provided to catch the potatoes as they fall through the conveyer, and to guide them to a bagging device or other suitable receptacle. As here shown, when the potatoes drop, they drop into a chute 21, which is connected with the hopper 22 of the bagging device shown and described in my United States Letters Patent No. 973,355, dated Oct. 18, 1910. The hopper is located at one side of the conveyer, so that the chute has a relatively slight pitch and opportunity is thus given for an operator to pick out any stones, turf, or other debris which comes down with the potatoes. The hopper 22, has a flaring portion 22$^a$ at the bottom over which fits an incomplete holding ring 23 secured to a vertically movable plug 24, playing freely in an upright hollow post 25 secured to a cross bar 25$^a$. The hopper is secured to the upper end of the post 25, and a lever 26 is provided for lifting the ring 23 to release the bag.

The bag is placed around the portion 22$^a$ and the ring allowed to drop down onto it to hold it firmly in position.

A suitable seat may be attached to the frame in such a position that an attendant can put on and release the bags as they become filled, and throw out any rocks or other foreign matter which comes down the chute or passes up the conveyer with the potatoes.

From what has been said, the operation of my harvester will be readily understood. The device is secured to the rear of any of the standard potato diggers at a point where the potatoes and vines will be received from the digger and deposited on the lower end of the conveyer. As the material passes up the inclined conveyer, the potatoes tend to roll downward and forward across the transverse rods and into the pockets or recesses formed between the adjacent sections, while the vines, turf, witch grass, etc., tend to remain at or near the upper portion of the sections. The pocket formed by the forward portion 12 of each conveyer section and the rear portion 11 of an adjacent section is large enough to receive all of the potatoes which will lodge on each section, and the potatoes while in this pocket are protected from becoming mixed with the mass of vines, earth, rocks, etc., from which they have been separated while on the conveyer When the discharge point is reached, the pivoted portions 12, drop down and dump the potatoes into the chute 21. As each bag is filled it is dropped to the ground, and another attached in its place. The rear portion 11, instead of being made in skeleton form, may be made solid.

In Fig. 6 I have shown the rear portion 11$^a$ made without openings, so that the dirt and other debris are prevented from falling through. I have illustrated in this figure, the manner in which the potatoes as they lodge in the pocket are protected from contact with the great mass of earth, etc. When the part 11ª is made imperforate, the potatoes in the remaining pocket are thoroughly sheltered and protected from the superposed dirt.

The potatoes may be discharged from the conveyer otherwise than here shown. In Fig. 5 is shown an alternative arrangement for discharging the potatoes laterally. A guide 27 on one side raises one of the chains 8 above the chain on the opposite side which rests on a guide 28. The potatoes are discharged laterally on a chute 29 and run off at the side.

It is evident that the details of the harvester, may be varied from the one here specifically described without departing from the spirit of the invention.

While I have designed my machine principally for a potato harvester, it may be used for harvesting beets, turnips, or any other crops which it is desired to separate the material to be collected from bulky debris which accompanies it.

It will be understood that while I have shown the several sections of the conveyer as made in skeleton or openwork form for the elimination of earth, they may be imperforate so long as space is left on the sides or ends for the dirt to sift down through. In other words, while the sections are not necessarily screening sections, the conveyer as a whole may be so and may be provided with screening openings which screen the dirt from the potatoes, vines, etc.

Should the potatoes be delivered to my cleaner from the digger free from dirt but mixed with turf, vines, grass, rocks, etc., it would not be necessary to provide openings for the dirt to pass bodily through the conveyer either through the buckets themselves or through spaces around the buckets, but the buckets might be imperforate and arranged close together. In this case the conveyer would still be a "screening conveyer" in the sense in which I use the term in that it screens or separates the vines, grass, weeds, etc., from the potatoes by carrying them on the tops of the buckets to be discharged over the rear of the machine while allowing the potatoes to drop down in the pockets formed in the buckets. It will thus be understood that by the use of the word "screening" I refer generally to the function of the conveyer as a means of separating the potatoes from the whole or part of the debris which come with them in the process of digging and as distinguished from the ordinary functions of a conveyer, and do not limit myself to any open construction.

I claim:

1. A potato cleaner including an endless screening conveyer for conveying the potatoes from the digger, said conveyer having skeleton sections and means for opening said sections at a discharge point on the upper or ascending side of the conveyer to allow the potatoes to pass through.

2. A potato cleaner including an endless screening conveyer of skeleton construction for conveying tops and potatoes and means for opening spaces through the conveyer larger in size than the normal openings and sufficiently large to permit the passage of all of the potatoes and at a single discharge point only.

3. A potato cleaner including an endless screening conveyer having pivoted sections underlapping on the upper or ascending side of the conveyer to form retaining pockets, and a guide on which the free ends of said sections travel, and by which they are kept normally closed.

4. A potato cleaner including an endless screening conveyer arranged to carry the potatoes up an incline, said conveyer having a series of sections each pivoted to allow the lower end to move vertically, and a guide for holding the free lower end of each section far enough below the fixed end of the following-adjacent section to form a stop or abutment to retain the potatoes while allowing the dirt to drop through.

5. A potato cleaner including an endless screening conveyer arranged to carry the potatoes up an incline, said conveyer having a series of underlapping skeleton sections pivoted to allow the lower end to move vertically, and a guide for holding the free lower end of each section far enough below the fixed end of the following adjacent section to form a stop or abutment to retain the potatoes while allowing the dirt to drop through.

6. A potato cleaner including an endless screening conveyer having a series of sections sloping forwardly and downwardly, a stop or obstruction being formed at the lower portion of each section to form a pocket to retain the potatoes while being conveyed, and means for opening said pockets to discharge their entire contents through the conveyer at a single discharge point, before reaching the top.

7. A potato cleaner having an endless screening conveyer composed of a series of sections each of which has a rear portion which in the upper or ascending side of the conveyer is held normally at a forward and downward inclination and a forward portion pivoted to the rear portion, and means for causing the forward end of said forward portion to drop at some point in the ascending side of the conveyer to discharge the potatoes.

8. A potato cleaner having an endless screening conveyer composed of a series of sections, each of which has a rear portion, and a forward portion pivoted to the rear portion, and guides for sustaining said rear portion in a relatively fixed position on the upper side of the conveyer.

9. A potato cleaner having an endless screening conveyer composed of a series of sections, each of which has a relatively fixed rear portion, and a forward portion pivoted to the forward end of the rear portion, a guide for holding the forward portion in a normally closed position on the upper side of the conveyer, said guide terminating at a point of discharge to allow said forward portion to discharge the potatoes.

10. A potato cleaner having an endless screening conveyer composed of a series of sections, each of which has a relatively fixed rear portion and a forward portion pivoted to the rear portion and underlapping the rear portion of the adjacent section on the ascending side of the conveyer to form a retaining pocket for the potatoes, and means for holding said pocket normally in a closed position.

11. A potato cleaner having an endless screening conveyer composed of a series of sections, each of which has a relatively fixed rear portion having a forward and downward inclination, and a forward portion pivoted to the rear portion, the rear portion being provided with a series of spurs or projections for catching the turf and vines.

12. A potato cleaner having an endless screening conveyer composed of a series of skeleton sections pivoted at one end and having the other end free to swing downwardly when on the ascending side of the conveyer, and each of which sections has a side bar on each side and cross bars uniting the side bars.

13. A potato cleaner having an endless screening conveyer composed of a pair of endless sprocket chains, a series of conveyer sections, each of which has a rear portion secured to the chains to have a forward and downward inclination, and a forward portion pivoted to the rear portion, and a guide for holding the free end of the forward portion in a normally elevated position when on the upper side of the conveyer while allowing it to drop below the body of the conveyer at a point of discharge on said upper side.

14. In a potato cleaner, the combination of a supporting frame, an endless screening conveyer supported by said frame having potato carrying sections, means for forming openings in the conveyer in its upper side to allow the potato to drop through at one discharge point only, a hopper at one side of the conveyer, a stationary chute connecting the hopper with the discharge point of the potatoes, and a receiving device beneath the hopper.

15. A potato cleaner including an inclined endless screening conveyer composed of sections, the lower ends of which underlap the adjacent sections on the ascending side of the conveyer, forming retaining pockets between adjacent sections for receiving and conveying the potatoes, and means for discharging the potatoes from said pockets before reaching the top.

16. A potato cleaner including an endless screening conveyer composed of sections which underlap on the upper side of the conveyer, the forward portion of each section making an angle with the rear portion of the adjacent section to form tapering pockets to receive and convey the potatoes.

17. A potato cleaner having an endless screening conveyer composed of sections, each of which has an imperforate rear portion and a forward portion pivoted to the rear portion, the forward portion of each section under-lapping the rear portion of the next adjacent section on the upper side of the conveyer to form a pocket for the potatoes.

18. In a potato cleaner, the combination of a supporting frame, wheels on which said frame is mounted, an endless conveyer supported by said frame having potato carrying sections, means for forming openings in the conveyer in its upper side to allow the potatoes to drop through at one discharge point only, a chute beneath said discharge point leading to one side of said conveyer and a receiving device into which said chute discharges.

19. In a potato cleaner, the combination of a supporting frame, wheels on which said frame is mounted, an endless conveyer supported by said frame having potato carrying sections, means for forming openings in the conveyer in its upper side to allow the potatoes to drop through at one discharge point only, a screening chute beneath said discharge point leading to one side of said conveyer and a receiving device into which said chute discharges.

20. In a potato harvester, the combination of an endless elevating conveyer having dumping sections arranged to dump potatoes between the ends of the upper run of the conveyer, and a guide on which said sections ride, each section being provided with a bar arranged to ride on said guide.

In testimony whereof I have affixed my signature, in presence of two witnesses.

EDWARD P. KENDALL.

Witnesses:
JAMES W. ALLEN,
P. C. NEALEY.